Jan. 14, 1941.  W. K. YOUNG  2,228,498
BORING TOOL
Filed March 22, 1939
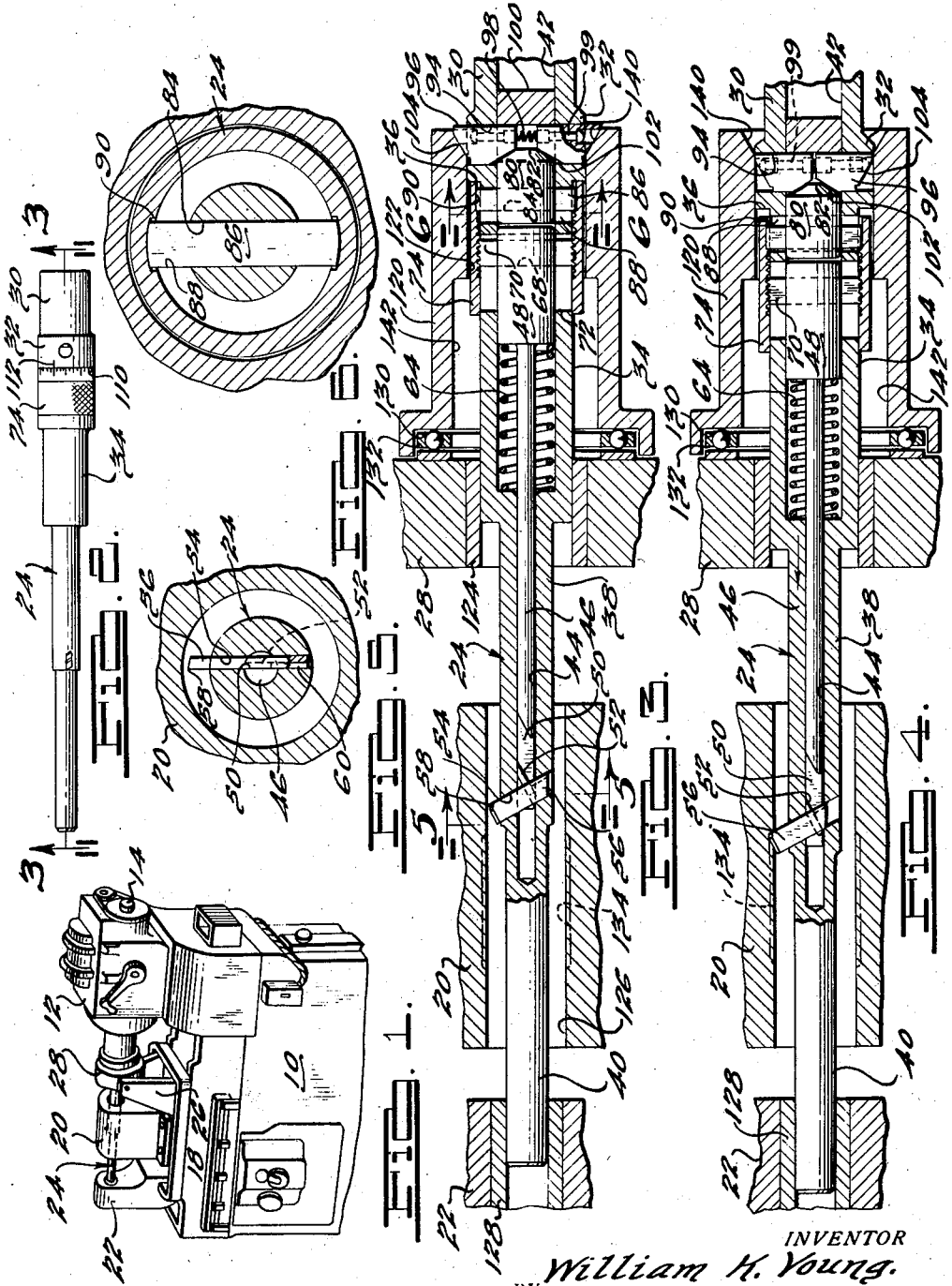
INVENTOR
William K. Young.
BY
Harness, Dickey & Pierce
ATTORNEYS.

Patented Jan. 14, 1941

2,228,498

UNITED STATES PATENT OFFICE 2,228,498

BORING TOOL

William K. Young, Detroit, Mich., assignor to Eclipse Counterbore Company, Detroit, Mich., a corporation of Michigan Application March 22, 1939, Serial No. 263,468

9 Claims. (Cl. 77—58)

This invention relates to boring tools and particularly to that type thereof having readily removable and replaceable blades capable of being adjusted in position during use, the principal object being the provision of a tool of this type in which the cutter blades may be expanded while received within a bore and maintained in expanded condition while being fed axially of the bore.

Other objects of the invention include the provision of a boring tool having one or more transversely disposed cutter blades supported and driven thereby together with novel means for effecting movement of the cutter blade or blades in a radial direction during operation of the tool; the provision of a boring tool of the type described having a novel and efficient form of connection between the cutter blade or blades and the operating or controlling means therefor so constructed and arranged as to minimize the weakening of the corresponding portion of the boring tool structure and thereby permitting the provision of a practical boring tool of materially smaller diameter than heretofore possible; the provision of a boring tool provided with one or more blades transversely adjustable with respect thereto so constructed and arranged as to permit the insertion of the cutter blade into a bore, transverse movement of the cutter blade with respect to the tool while in the bore whereby to move it into cutting relation with respect to the walls of the bore, and maintaining the expanded condition of the cutter blade during a continued movement of the tool axially of the bore whereby to machine a recess therein; the provision of a construction as above described in which the expansion of the cutter blade in the bore occurs automatically as a function of the axial movement of the boring tool; the provision of a construction as above described in which means are provided for automatically expanding the cutter blade and maintaining it in expanded condition during a predetermined travel of the boring tool in an axial direction and automatically collapsing or withdrawing the cutter blade upon completion of said predetermined axial travel; the provision of a boring tool as above described in which manually adjustable means are provided for varying the effective diameter or swing of the expanded cutter blade, not only to permit the diameter of the bore machined thereby to be controlled within desirable limits, but also to compensate for changes in size of the cutter blade occurring as a result of a re-grinding operation to overcome the effects of wear thereon; to provide a boring tool of the type described in which means are provided for accurately and visually controlling the effective swing or diameter of the cutter blade whereby variations in the diameters of bores machined thereby may be varied by manipulating the adjustments and without requiring checking of the diameter of the bore after each such adjustment; and the provision of a boring tool that is relatively simple in construction, efficient in operation and relatively economical to produce.

The above being among the objects of the present invention the same consists in certain novel features of construction and combinations of parts to be hereinafter described with reference to the accompanying drawing, and then claimed, having the above and other objects in view.

In the accompanying drawing which illustrates a suitable embodiment of the present invention, and in which like numerals refer to like parts throughout the several different views, Fig. 1 is a fragmentary perspective view of a boring machine or mill illustrating a boring tool embodying the present invention suitably mounted therein and in operative relation with respect to a piece of work supported in the machine;

Fig. 2 is an enlarged side elevational view of the boring tool illustrated in the boring machine or mill shown in Fig. 1;

Fig. 3 is an enlarged sectional view taken axially through the boring tool shown in Fig. 2, as on the line 3—3 thereof, and illustrating certain parts of the boring machine or mill, work and expansion collar, shown in conjunction therewith in Fig. 1, arranged in operative relation with respect thereto, the various parts of the boring tool being shown in the position assumed when the cutter blade is retracted;

Fig. 4 is a view similar to Fig. 3 but illustrating the various parts of the boring tool in a position in which the cutter blade is moved to fully expanded position;

Fig. 5 is an enlarged transverse sectional view taken on the line 5—5 of Fig. 3; and, Fig. 6 is an enlarged transverse sectional view taken on the line 6—6 of Fig. 3.

While a boring tool constructed in accordance with the present invention may be employed for machining a bore of constant diameter throughout, it is particularly designed for and is particularly valuable in connection with the machining of bores having stepped surfaces. In other words, it is particularly valuable in connection with the machining of relief enlargements, grooves or the like in the bores of machine tool parts or the like. Its primary importance lies in its capability of being introduced into a bore and after the cutting blade thereof has reached a predetermined axial position in the bore, automatically expanded into machining relation with respect to the interior surfaces of the bore, and maintaining such expanded condition during continued axial travel of the tool in the bore whereby to permit the bore to be relieved over a predetermined distance of the length thereof. The mechanism provided is such as to accurately control the amount of radial movement of the blade upon expansion and further is such as to permit the initial or inoperative position or location of the cutting edges of the blade to be manually adjusted with respect to the axis of the tool whereby the effective diameter of the blade when expanded may be accurately and positively controlled and adjusted in service.

Referring now to the accompanying drawing and particularly to Fig. 1 thereof a conventional type of boring machine or boring mill is shown to which the present invention is applicable, it being understood in this respect, however, that the present invention is applicable to any conventional type of boring machine or boring mill, drill press, or the like and regardless of whether the work is fed toward the tool or the tool is fed toward the work, and whether the tool or the work is rotated. The particular boring machine illustrated in Fig. 1 includes a supporting base structure generally indicated at 10 provided with a driving head indicated generally at 12 thereon and including a rotatable driving spindle 14. The base 10 is also provided with conventional slides upon which a suitable table or work support 18 is slidably mounted for feeding or other movement in a direction parallel to the axis of the spindle 14. The particular table 18 shown is provided with suitable and conventional means for receiving, locating and securing a piece of work such as 20 in fixed relation thereto, an outboard bearing support or guide 22 for the boring bar here indicated generally at 24, and suitable supports 26 fixed to the table 18 and supporting a stop collar 28 in preferably fixed position thereon. It will be understood that the boring bar 24 is received by the spindle 14 in axially aligned relation with respect thereto and cooperates therewith in a conventional manner for receiving driving movement therefrom.

Boring bars constructed in accordance with the present invention may be provided with more than one cutter blade, projecting in the same or opposite directions from the tool, simply by providing the required number of apertures in the body portion of the tool required to receive such blades and by forming the blade actuating plunger for cooperation with such blades. For the purpose of simplicity in description and explanation, however, the tool shown by way of illustration is equipped with a single cutter blade, the manner in which additional cutter blades may be provided thereby being made clear to those skilled in the art.

The boring bar itself as illustrated in the drawing comprises a main body portion of circular cross-sectional configuration throughout having at one end thereof a hollow shank 30 which may be of any suitable size or shape adapting it for reception in a driving spindle or the like, an adjacent portion 32 shown of slightly greater diameter than the portion 30 but which obviously may be either larger or smaller, followed by an adjacent portion 34 of smaller diameter than the portion 32 so as to form a radially directed annular shoulder 36 at its junction therewith, a next adjacent portion 38 shown of smaller diameter than the portion 34 but which obviously, under some circumstances at least, may be of a diameter not to exceed the diameter of the portion 34, and finally and preferably but not necessarily, an opposite end or pilot portion 40 which may be of the same or smaller diameter than the portion 38 but which is shown as of smaller diameter particularly for the purpose of illustration. The shank 30 is provided with a concentric cylindrical bore 42 which continues at full diameter through the portion 32 and into the portion 34 to a point adjacent the outer end thereof, as illustrated in Figs. 3 and 4, where it joins with a smaller and continuing bore 44 concentric with the axis of the main body portion of the tool and which extends down into the pilot portion 40 as illustrated. Freely slidably but relatively closely received within the bore 44 is a cylindrical plunger 46 which extends into the bore 42 and is there provided with an enlarged cylindrical head 48 freely slidably but relatively closely received therein.

The outer end of the plunger 46, that is that end disposed towards the blind end of the bore 44, is machined off on one side thereof in a plane parallel to its axis so as to provide a flat diametrically disposed surface 50 provided with an upstanding key 52 formed integrally thereon and disposed at an oblique angle with respect to the axis of the plunger 46. The outer end portion of the portion 38 of the main body of the tool is provided with a transverse opening 54 of rectangular section therethrough and while the axis of this opening may be disposed perpendicularly with respect to the axis of the main body portion it is preferably and thus shown disposed at an oblique angle to a plane perpendicular to such axis. As best illustrated in Fig. 5 it will be noted that one side face of the opening 54 lies in the same diametrical plane as the surface 50 on the plunger 46. Longitudinally slidably and relatively closely received in the opening 54 is a cutter blade 56 of the same cross-sectional configuration as the opening 54 and having a cutting edge 58. The cutter blade 56 is provided with a groove 60 in that face thereof which lies in contact with the surface 50 of such size and disposed at such an angle as to closely but slidably receive the key 52 therein.

As will be appreciated from the above description, with the construction described upon axial movement of the plunger 46 the interengagement of the key 52 with the grooves 60 in the cutter blade 56 will cause the cutting edge 58 of the cutter blade 56 to be projected from or withdrawn towards the axis of the plunger 46, depending upon the direction of movement thereof, the relation of the parts being such that movement of the plunger 46 outwardly or to the left as viewed in Figs. 3 and 4 will cause the cutting edge 58 of the blade 56 to be projected to a position such, for instance, as illustrated in Fig. 4, will cause the blade 56 and movement in the opposite direction to be retracted or withdrawn to a position such, for instance, as illustrated in Fig. 3. The cutter blade 56 being of the same cross-sectional configuration as the opening 54 and being closely received therein, serves to seal the space between it and the walls of the openings 54 against the infiltration of dust, dirt or other foreign material to the bore 44 there past.

A coil spring 64 surrounding the plunger 44 within the bore 42 and maintained under compression between the shouldered end of the bore 42 and the opposed end of the enlarged head 48 constantly urges the plunger 46 to the right as viewed in Figs. 3 and 4 and consequently the cutter blade 56 towards a retracted position such as illustrated in Fig. 3. As will be apparent if sufficient movement of the plunger 46 in this direction is permitted the key 52 will be withdrawn from the groove 60 in the cutter blade 56 and will permit the cutter blade 56 to be withdrawn from the tool, this fact being utilized both in assembly of the tool and in removal of the blade 56 for sharpening or replacement. Ordinarily, however, it will be understood that the retracting movement of the plunger 46 is limited during normal operation an amount insufficient to withdraw the key 52 from the groove 60 and, therefore, disengagement of the plunger 46 from the cutter blade 56.

In order to limit retracting movement of the plunger 46 during normal operation, the enlarged head portion 48 of the plunger 46 adjacent its inner or right hand end as viewed in Figs. 3 and 4 is provided with a diametrical opening 68 therethrough. Within the opening 68 is slidably received a transversely extending bar or member 70 the opposite outer ends of which are provided with threads. The outer ends of the bar or member 70 project through a diametrical slot 72 formed in the main body portion 34, and the length of the bar or member 70 is such that both threaded end portions thereof project radially outwardly of the surface of the portion 34 a distance equal to the depth of the threads on the bar member. It will be noted that the length of the slots 72 axially of the tool is materially greater than the dimension of the bar member 70 axially of the tool so as to permit axial movement of the plunger 46 in the tool between the limits of movement of the bar 70 in the slot 72. It will be appreciated that the spring 64 normally urges the plunger 46 and the enlarged head 48 thereof towards the right as viewed in Figs. 3 and 4 and consequently urges the bar member 70 towards contact with the righthand end of the slot 72, but whether the bar member actually contacts with such end of the slot 72 depends upon the adjustment of the tool as will hereinafter be more apparent.

Rotatably and slidably received upon the outer surface of the portion 34 of the main body of the tool is a sleeve member or nut 74 which is interiorly provided with screw threads with which the screw threads on the outer ends of the bar member 70 are operatively engaged. The threaded engagement of the bar 70 and the nut 74 thus constrains the nut 74 to equal movement with the plunger 46 axially of the tool but it will be appreciated that by rotating the nut 74 with respect to the main body portion of the tool it will be axially displaced with respect to the bar 20 because of its threaded engagement therewith and, accordingly, the axial position of the nut 74 may thus be varied with respect to the plunger 46. The exterior surface of the nut 74 is preferably knurled as illustrated in Fig. 2 to permit manual grasping of the same to effect rotation thereof. The inner or righthand end of the nut 74 as illustrated in Figs. 3 and 4 is adapted to extend into engagement with the shoulder 36 provided between the portions 32 and 34 of the main body of the tool. This contact of the nut 74 with the shoulder 36 acts, as illustrated in Fig. 3, through the bar 70 to limit the retracting movement of the plunger 46, or movement to the right as viewed in Figs. 3 and 4, under the influence of the spring 64, and thus acts to limit the amount of retraction of the cutter blade 56 into the tool when the tool is in retracted position.

Axially slidably but relatively closely received in the bore 42 immediately inwardly or to the right of the enlarged head 48 of the plunger 46, as viewed in Figs. 3 and 4, is a short plunger 80 the outer or lefthand end of which is normally axially spaced from the end of the enlarged head 48 of the plunger 46, and the inner or righthand end thereof as viewed in Figs. 3 and 4 is formed to provide a frusto-conical surface 82. The plunger 80 is provided with a diametrical slot 84 therethrough in which is received a diametrically extending bar or member 86 and the main body portion 34 is provided with a diametrical slot 88 therethrough rearwardly, or to the right as viewed in Figs. 3 and 4, from the slot 72 and through which the ends of the bar 86 project. The outer ends of the bar 86 project outwardly beyond the circumference of the main body portion 34 and are received in short axially directed recesses or grooves 90 formed in the inner wall of the nut 74 and opening onto the rear or righthand axial face of the sleeve or nut 74 as viewed in Figs. 3 and 4 and as best brought out in Fig. 6. As in the case of the slot 72, the slot 88 is of greater length, measured in a direction axially of the tool, than the corresponding dimension of the bar 86 so that the bar 86 is capable of movement longitudinally or axially of the tool within the limits of the axial dimension of the slot 88. As will be noted from an inspection of Figs. 3 and 4 the forward ends of the grooves or recesses 90 in the nut 74 provide stops or shoulders against which the radially outer and axially forward margins of the bar 86 are adapted to contact.

The main body portion 32 of the tool is also provided with a diametrical slot 94 therethrough in which a pair of opposed keys 96 are relatively closely but slidably received for radial movement therein. The keys 96 are duplicates of each other and are arranged in opposed relation in the slot 94 and are constantly urged outwardly away from one another by means of a coil compression spring 98 the opposite ends of which are received in opposed pockets formed in the opposed end surface of the keys. The bore 42 immediately inwardly or to the right of the keys 96 as viewed in Figs. 3 and 4 is closed by a plug 100 which not only serves to additionally back up the keys 96, but also serves to prevent inadvertent projection of the plungers 46 and 80 rearwardly out of the tool and also aids in sealing the interior thereof against the entrance of dust and dirt.

The radially inner and axially outer face of each key 96 is provided with a bevelled edge 102 complementary in angularity to and adapted to contact with the frusto-conical surface 82 at the rear end of the plunger 80. The radially outer end of each of the keys 96 is also beveled in a radially inwardly and axially outer direction as at 104 and this last end of each of the keys 96 is adapted to project radially outwardly beyond the outer surface of the body portion 32 when the tool is in inoperative position with the cutter blade 56 retracted.

It will be understood from the description thus far given that if the keys 96 are urged radially inwardly toward one another they will act through their beveled faces 102 contacting the frusto-conical portion 82 of the plunger 80 to move the plunger 80 outwardly or to the left as viewed in Figs. 3 and 4. When the plunger 80 is thus moved towards the left as described it will carry the bar member 86 therewith and the bar member 86 in moving a corresponding distance to the left will act against the ends of the grooves or recesses 90 in the nut 74 to move the nut 74 to the left a corresponding distance. The nut 74 in thus moving to the left will act through the bar member 70 and head 68 of the plunger 46 to move the plunger 46 a corresponding distance to the left and this movement of the plunger 46 will act to project the cutter blade 56 outwardly with respect to the axis of the tool as previously described.

It will be appreciated that the amount which the cutter blade 56 will thus be projected in a generally radial direction with respect to the axis of the tool will depend upon the amount of relative axial reciprocation imparted to the plunger 46 and the parts thus described forming a driving connection between it and the keys 96, and the relative axial movement of which with respect to the body of the tool will depend upon the amount of radially inward movement imparted to the keys 96. It will also be appreciated that for a given amount of radially inward movement of the keys 96, the blade 56 will be projected radially to the same extent under all circumstances. Consequently in order to adjust the tool so that the cutter blade 56 will machine a bore of greater or lesser diameter than then set for, the initial or inoperative position of the blade must be adjusted so that upon a given projection of the cutter blade the required diameter of bore will be machined by the blade. This inoperative or retracted position of the cutter blade 56 is, of course, adjusted by rotating the nut 74 to either advance or retract the plunger 46 depending upon whether it is desired to machine a larger or a smaller bore respectively. In other words by rotating the nut 74 in one direction it will act through the bar 70 to advance the plunger 46 and, therefore, project the blade 56 to a greater extent from the tool in its inoperaitve condition and upon turning the nut 74 in a reverse direction it will retract the blade 56 to a further extent into the tool.

In order to facilitate the thus above described adjustment and to enable the amount of adjustment to be visually determined, spaced graduations 110 are provided circumferentially around the outer righthand end of the nut 74, as best illustrated in Fig. 2, and an indicator mark 112 is provided on the body portion 32 for cooperation therewith. The pitch of the threads on the interior of the nut 74 are preferably so correlated with the angularity of the key 52 and the angularity of the blade 56 that one complete rotation of the nut 74 will radially project or retract the cutting edge 58 of the blade 56 an even part of an inch, for instance $\frac{1}{100}$th of an inch, in which case if graduations 110 are provided with one hundred subdivisions movement of the nut 74 through the distance of one graduation only will vary the radial position of the cutting edge 58 $\frac{1}{10000}$th of an inch. It will, of course, be appreciated that the radial movement imparted to the cutting edge 58 of the cutter blade 56 upon a complete rotational movement of the nut 74, and, accordingly, the number of graduations 110 employed, may be varied to suit the desires of the individual designer.

It will likewise be appreciated that the amount which the cutting edge 58 of the blade 56 will be projected in a radial direction upon contraction of the keys 96 will depend upon the amount of contraction or radially inward movement of the keys 96 after contact with the surface 82 of the plunger 80. The means preferably employed to effect a contraction of the keys 96 is a collar or sleeve which is forced over them or through which the tool passes or is forced. In other words by forcing a collar or sleeve over the nut portion 74 and the body portion 32, and assuming that the bore of the collar or sleeve is less than the distance between the opposite outer ends of the keys 96 when in expanded condition, the act of forcing the sleeve or collar over the keys 96 will cause the keys 96 to be advanced toward one another and thereby effect movement of the various parts of the tool in the manner previously described to cause the cutter blade 56 to be projected in a generally radial direction upon the tool.

If the tool is employed for a boring operation while the keys 96 are thus retracted, and assuming that they are contracted to this same extent during the continuance of the boring operation, the bore machined by the cutter blade 56 will be of a uniform diameter. Should, however, the sleeve or collar employed for contracting the keys 96 have a bore of varying diameter and the tool is fed axially relative to both the work and the sleeve or collar when the cutter blade is expanded by the sleeve or collar, it will be appreciated that the bore thus machined by the cutter blade will vary an amount proportional to the variation in the diameter of the bore of the sleeve or collar because of the changing relation of the keys 96 to each other as controlled thereby. Likewise if the sleeve or collar is provided with a plurality of cylindrical bore sections of different diameters which will contract the keys 96 different amounts during the passage of the keys 96 therethrough, and the bore machined by the cutter blade 56 will vary in diameter in proportion to the variations in diameter of the various portions of the bore of the sleeve or collar.

As a matter of illustration the particular sleeve or collar 120 illustrated in the drawing for the purpose of contracting the keys 96 to expand the tool is shown as being provided with a cylindrical bore 122 of constant diameter for effecting expansive movement of the tool, the use of other sleeves or collars having bores of other shapes, as for instance uniformly or otherwise varying or stepped surfaces, being thereby made apparent to those skilled in the art.

In employing a sleeve such as the sleeve 120 for the purpose of expanding the tool during operation, the sleeve is preferably caused to be forced over the keys 96 as an incident to the feeding operation of the tool with respect to the work. For instance, in the application of the tool to a machine of the type illustrated in Fig. 1 in which the tool is rotated by the spindle 14 but the relative feed between the tool and the work is effected by moving the work in a direction axially of the tool, the arrangement illustrated in Fig. 1 and more clearly brought out in Figs. 3 and 4 is preferably employed. In other words and particularly referring to Figs. 3 and 4 and assuming that the shank end 30 of the tool is suitably supported by the spindle 14 for rotary driving motion therefrom, it will be observed that the outer end of the main body portion 34 of the tool is rotatably received and guided in a suitable bushing 124 provided in the stop collar 28. The portions 38 and 40 of the tool project through a cylindrical bore 126 in the work 20 and the extreme outer end of the portion 40 is rotatably received in and guided by a bushing 128 in the pilot 22 which thus forms an outboard bearing for the tool. The outer end of the sleeve or collar 120 is enlarged and interiorly annularly recessed at 130 to receive a thrust bearing 132 therein and the sleeve 120 is placed around the tool and positioned with the thrust bearing 132 in contact with the stop collar 28. Assuming that it is desired to relieve the bore 126 in the work 20 over a distance and to a depth indicated by the dotted lines 134, the length of the sleeve 120 or else the position of the work 20 with respect to the stop collar 28 will be such that as the tool is advanced into the bore 126 of the work 20 the cutter blade will reach a position such as indicated in Fig. 3, and in which the cutting edge 58 of the cutter blade 56 is at the righthand limit of the portion 134 which it is desired to relieve at the moment, the keys 96 simultaneously contact the entering end of the sleeve or collar 120 and the surface 82 of the plunger 80. In this connection it will be noted that the entering end of the sleeve or collar 120 is beveled off as at 140 for complementary engagement with the beveled ends 104 of the keys 96. After the tool has reached the position illustrated in Fig. 3 and as above described, it will be appreciated that upon continued axial feeding movement of the work relative to the tool the keys 96 will, during the initial feeding movement, be contracted or urged toward one another to effect expansion of the tool and, therefore, radial projection of the cutter blade 56 until the extreme outer ends of the keys 96 are confined within the cylindrical bore 122 of the sleeve 120, at which time the cutter blade 56 will have been projected to the desired radial extent to effect machining of the relief 134 in the work 20 to the desired depth, and during continued relative feeding movement between the tool and work while the keys 96 are contained within the cylindrical bore 122 of the sleeve 120 the cutter blade 56 will machine the relief 134 in the work 20 at a constant diameter.

The axial length of the relief 134 in the work 20 may be controlled in one of several different ways. For instance the boring machine may be so controlled that after the carriage or table 18 carrying the work 20 has advanced towards the head 12 a sufficient distance it may be reversed in direction of feed whereby the blades 56 will be maintained in an expanded condition until it reaches the relative position illustrated in Fig. 4 whereupon further reversal of the feeding movement will withdraw the keys 96 from under the collar 120 and permit their expansion and, therefore, contraction of the cutter blade 56 during the remaining withdrawing movement of the tool from the work. In employing this last described arrangement it will be necessary to employ some suitable or conventional means for maintaining the axial position of the feed 20 against the inner face of the stop collar 28 as will be readily appreciated.

On the other hand the length of the bore 122 of the feed 20 may be formed to correspond with the length of the relief 134 desired in the work, the remaining bore of the sleeve 120 being greater than the bore 122 so that when the keys 96 have travelled through the sleeve 122 a distance corresponding with the desired length of the relief 134 in the work 20, they will pass beyond the end of the bore 122 and thereby permit it to expand and effect contraction of the tool thus terminating the machining of the relief. This is the particular construction illustrated in Figs. 3 and 4 in which it will be noted that the length of the cylindrical bore 122 of the sleeve 120 corresponds with the length of the relief 134 in the work 20. The sleeve 120 in this case is provided with a second bore 142 at the outer end of the bore 122 permitting the keys 96 to be expanded thereinto after having been fed axially past the end of the bore 122. With this last described construction unless the shoulder formed between the bores 122 and 142 is beveled in a direction opposite to the bevel 140 and the corresponding rear edges of the keys 96 are correspondingly beveled so as to permit withdrawal of the tool rearwardly with respect to the sleeve 120, in order to re-condition the machine for subsequent operations it will be necessary to withdraw the boring tool from the machine spindle, withdraw the sleeve 120 from the rear or inner end of the boring tool, then replace it upon the forward end of the boring tool and replace the boring tool in the machine spindle.

From the above description it will be understood that the construction of the tool described is such as to permit the tool to be inserted in a bore in a piece of work to a desired position, the tool expanded so as to remove metal from such bore to provide a relief therein if desired or to machine the entire bore out to a uniform or a varying diameter during a continued feeding movement between the tool and work, and that the expansion of the tool and consequently the diameter of the bore machined thereby occurs automatically as an incident to the feeding movement of the tool with respect to the work. It will also be appreciated that particularly where the various parts of the tool are machined to relatively close limits and are accurately fitted with respect to each other as they naturally will be when properly constructed, adjustment of the tool to change the diameter of the bore being machined it may be manually adjusted and visually determined to a highly accurate degree. It is to be particularly noted that the particular arrangement employed for effecting expansion and contractive movements of the cutter blade 56, namely by employing a relatively small plunger 46 and machining the flat 50 and key 52 thereon for engagement with a groove in the cutter blade, does not materially detract from the strength of the plunger or cutter blade and yet provides an efficient and accurate connection between the two. Furthermore, in view of the additional fact that by the use of the present invention the portion 38 of the body of the tool is provided with a slot of only sufficient size to receive the cutter blade 56 therein and is not required to be slotted to any greater extent, the portion 38 of the body of the tool is weakened by such slotting to a minimum extent and all of these features combined to permit a tool to be constructed in accordance with the present invention capable of operating in materially smaller bores than has heretofore been possible with previously suggested constructions of a similar type. It will also be appreciated that the tool and the apparatus employed for controlling the expansion thereof and continuance of expansion during a predetermined feeding movement is such as to adapt it to a wide range of variations in construction and effects in operation, rendering it suitable for application to many uses which have not been heretofore possible with similar types of tools constructed as previously suggested.

Formal changes may be made in the specific embodiment of the invention described without departing from the spirit or substance of the broad invention, the scope of which is commensurate with the appended claims.

What I claim is:

1. In a boring tool, in combination, a main body portion, a plunger within said main body portion mounted for movement axially of said main body portion, a cutter blade supported and guided by said main body portion for movement in a direction transverse to the axis of said main body portion, means interconnecting said cutter blade and said plunger for simultaneous movement in the direction of their respective lengths, means supported by said main body portion in axially spaced relation thereon with respect to said cutter blade for movement towards and away from the axis of said main body portion, means interconnecting the last mentioned means with said plunger so constructed and arranged as to positively move said plunger in at least one direction upon movement of the first mentioned means in at least one direction relative to said axis of said main body portion, and means having a relative axial movement with respect to said main body portion cooperable with said second mentioned means during said relative axial movement to control the position of said second mentioned means with respect to the axis of said main body portion.

2. In a boring tool, in combination, a main body portion, a plunger within said main body portion mounted for movement axially of said main body portion, a cutter blade supported and guided by said main body portion for movement in a direction transverse to the axis of said main body portion, means interconnecting said cutter blade and said plunger for simultaneous movement in the direction of their respective lengths, means supported by said main body portion in axially spaced relation thereon with respect to said cutter blade for movement towards and away from the axis of said main body portion, means interconnecting the last mentioned means with said plunger so constructed and arranged as to positively move said plunger in one direction upon movement of the first mentioned means in one direction relative to said axis of said main body portion, and resilient means constantly urging said plunger in a direction opposite to the direction imparted thereto by the second mentioned means.

3. In a boring tool, in combination, a main body portion, a plunger within said main body portion mounted for movement axially of said main body portion, a cutter blade supported and guided by said main body portion for movement in a direction transverse to the axis of said main body portion, means interconnecting said cutter blade and said plunger for simultaneous movement in the direction of their respective lengths, means supported by said main body portion in axially spaced relation thereon with respect to said cutter blade for movement towards and away from the axis of said main body portion, means interconnecting the last mentioned means with said plunger so constructed and arranged as to positively move said plunger in one direction upon movement of the first mentioned means in one direction relative to said axis of said main body portion, and means in the connection between the second mentioned means and said plunger operative to effect adjustment in the axial position of said plunger in said main body portion independently of movement of said second mentioned means.

4. In a boring tool, in combination, a main body portion, a plunger within said main body portion mounted for movement axially of said main body portion, a cutter blade supported and guided by said main body portion for movement in a direction transverse to the axis of said main body portion, means interconnecting said cutter blade and said plunger for simultaneous movement in the direction of their respective lengths, means supported by said main body portion in axially spaced relation thereon with respect to said cutter blade for movement towards and away from the axis of said main body portion, means interconnecting the last mentioned means with said plunger so constructed and arranged as to positively move said plunger in one direction upon movement of the first mentioned means in one direction relative to said axis of said main body portion, and means in the connection between the second mentioned means and said plunger operative to effect adjustment in the axial position of said plunger in said main body portion independently of movement of said second mentioned means, comprising a nut threadably interconnected with said plunger and means operatively connecting said nut with said first mentioned means.

5. A boring tool comprising, in combination, a main body portion, a cutter blade supported and guided thereby for effective movement towards and away from the axis of said main body portion, means interiorly of said main body portion cooperating with said cutter blade to control said movement thereof, a nut exposed exteriorly of said main body portion, a threadable connection between the first mentioned means and said nut, said nut being mounted for both rotatable and axial movement on said main body portion, an axially disposed stop, spring means constantly urging said nut towards said stop, control means supported by said main body portion and projectable radially outwardly therebeyond, and means interconnecting said control means and said nut for effecting movement of said nut and said first mentioned means against the force of said spring upon movement of said control means towards the axis of said main body portion.

6. A boring tool comprising, in combination, a main body portion, a cutter blade supported by said main body portion and movable towards and away from the axis of said main body portion, a plunger within said main body portion, means operatively interconnecting said plunger and cutter blade for inter-related movement in the direction of their respective lengths, a sleeve-like member rotatably and axially slidably mounted on said main body portion, means effecting a threaded connection between said plunger and said sleeve-like member whereby to permit adjustment of one axially with respect to the other, a second plunger within said main body portion, means interconnecting said second plunger and said sleeve-like member for equal movement in at least one direction axially of said main body portion, and means carried by said main body portion for movement in a direction transverse to the axis thereof and normally projecting outwardly beyond the circumference of said main body portion cooperable with said second plunger for effecting movement thereof axially of said main body portion upon movement of the last mentioned means towards the axis of said main body portion.

7. Boring apparatus including, in combination, a boring tool adapted for relative rotation and relative axial advancement with respect to a piece of work and having a main body portion, a cutter blade supported and guided by said main body portion for movement toward and away from the axis of said main body portion, means supported by said main body portion for movement toward and away from the axis thereof and normally projected radially beyond the circumference of said main body portion, means interconnecting said cutter blade and the first mentioned means for correlated movement with respect to the axis of said main body portion, and means associated with said tool for controlling the position of the second mentioned means with respect to the axis of said main body portion by and during axial movement of said main body portion with respect thereto.

8. Boring apparatus including, in combination, a boring tool adapted for relative rotation and relative axial advancement with respect to a piece of work and having a main body portion, a cutter blade supported and guided by said main body portion for movement toward and away from the axis of said main body portion, means supported by said main body portion for movement toward and away from the axis thereof and normally projected radially beyond the circumference of said main body portion, means interconnecting said cutter blade and the first mentioned means for correlated movement with respect to the axis of said main body portion, and means associated with said tool for controlling the position of the second mentioned means with respect to the axis of said main body portion during axial movement of said main body portion, comprising a sleeve surrounding said tool and adapted for the same relative movement as the work axially of said tool.

9. Boring apparatus including, in combination, a boring tool adapted for relative rotation and relative axial advancement with respect to a piece of work and having a main body portion, a cutter blade supported and guided by said main body portion for movement toward and away from the axis of said main body portion, means supported by said main body portion for movement toward and away from the axis thereof and normally projected radially beyond the circumference of said main body portion, means interconnecting said cutter blade and the first mentioned means for correlated movement with respect to the axis of said main body portion, and means associated with said tool for controlling the position of the second mentioned means with respect to the axis of said main body portion during axial movement of said main body portion, comprising a sleeve adapted to surround said tool and having a bore adapted to engage the second mentioned means during relative advancement of said tool with respect to the work thereby to control both the extent and duration of radial projection of the second mentioned means with respect to the axis of said main body portion during travel therethrough.

WILLIAM K. YOUNG.